(12) United States Patent
Onoguchi

(10) Patent No.: US 7,246,804 B2
(45) Date of Patent: Jul. 24, 2007

(54) SNOWBOARD WITH HANDLE

(75) Inventor: Kohichi Onoguchi, Tokyo (JP)

(73) Assignee: NEXAM Inc., Tokyo (JP)

( * ) Notice: Subject to any disclaimer, the term of this patent is extended or adjusted under 35 U.S.C. 154(b) by 252 days.

(21) Appl. No.: 10/972,369

(22) Filed: Oct. 26, 2004

(65) Prior Publication Data

US 2005/0087942 A1    Apr. 28, 2005

(30) Foreign Application Priority Data

Oct. 27, 2003    (JP)    ............. 2003-366621

(51) Int. Cl.
*B62B 13/16*    (2006.01)
(52) U.S. Cl. ............... 280/14.27; 280/14.21; 280/21.1
(58) Field of Classification Search ............ 280/14.27, 280/14.28, 14.21, 21.1, 87.041, 87.05
See application file for complete search history.

(56) References Cited

U.S. PATENT DOCUMENTS

| 1,284,663 | A | * | 11/1918 | Hamilton | 280/14.28 |
|---|---|---|---|---|---|
| 3,529,847 | A | * | 9/1970 | Shores | 280/14.22 |
| 4,129,313 | A | * | 12/1978 | Benson | 280/14.27 |
| 4,533,150 | A | * | 8/1985 | Hardy | 280/14.28 |
| 5,351,975 | A | * | 10/1994 | Petoud | 280/14.28 |
| 5,516,126 | A | * | 5/1996 | Myers | 280/14.28 |
| 6,139,031 | A | * | 10/2000 | Wingard | 280/14.28 |
| 6,199,880 | B1 | * | 3/2001 | Favorito et al. | 280/87.042 |
| 6,929,267 | B2 | * | 8/2005 | Sullivan et al. | 280/14.28 |
| 6,969,076 | B2 | * | 11/2005 | Spiers | 280/14.28 |
| 6,997,465 | B2 | * | 2/2006 | Jungnickel | 280/14.27 |
| 2004/0171463 | A1 | * | 9/2004 | Rozycki et al. | 482/51 |
| 2005/0212229 | A1 | * | 9/2005 | Rawcliffe | 280/14.27 |
| 2005/0280223 | A1 | * | 12/2005 | Su | 280/14.27 |

FOREIGN PATENT DOCUMENTS

JP    2001-310008    11/2001

\* cited by examiner

*Primary Examiner*—Jeff Restifo
(74) *Attorney, Agent, or Firm*—Wenderoth, Lind & Ponack, L.L.P.

(57) ABSTRACT

A snowboard with a handle includes a gliding plate, a rotary shaft mounted on the upper side of the gliding plate on its front side and having a central axis passing across the gliding plate, and a handle portion disposed on the upper side of the gliding plate. The handle portion has its bottom end mounted pivotally to the rotary shaft so that the top end of the handle portion can swivel upwardly and downwardly around the rotary shaft The portion of the gliding plate that extends from the point where the central axis passes across the gliding plate toward its front end is narrower than the portion of the gliding plate that is located at the point where the central axis passes across the gliding plate.

4 Claims, 7 Drawing Sheets

SNOWBOARD WITH HANDLE

BACKGROUND

1. Field of the Invention

The present invention relates generally to a snowboard on which one can glide on snow. More particularly, the present invention relates to a snowboard with a handle that includes a gliding plate having a gliding surface on its underside, the gliding surface having edges extending in the longitudinal direction thereof along the opposite lateral sides of the gliding plate, a rotary shaft mounted on the upper side of the gliding plate on its front side and having a central axis passing across the gliding plate, and a handle portion disposed on the upper side of the gliding plate, wherein the handle portion has grip portions on the top end thereof, and has its bottom end mounted pivotally to the rotary shaft so that the top end of the handle portion where the grip portions are located can swivel upwardly and downwardly around the rotary shaft by causing the bottom end to turn around the central axis.

2. Prior Art

A snowboard consists essentially of a gliding plate on which one can glide over snow-covered slopes. As shown in FIG. 6(a), for example, this gliding plate curves upwardly on its front side (the right side in FIG. 6(a)) and rear side (the left side in FIG. 6(a)). The snowboard is one of the snow sporting or playing goods like a ski, in that both are used to permit the user to glide over snow by standing on the middle of the upper side of the gliding plate.

The snowboard differs from the ski in that the former is smaller in length and much larger in width than the latter, and thus allows the user to place both of the legs on a single gliding plate.

Like the skier on the ski, the snowboarder on the snowboard can glide over the snow-covered slopes on a zigzag like the slalom. Because of its smaller length and larger width than the ski as described above, the user can glide on the snowboard more easily and more stably. For this reason, the snowboard is more familiar with beginners in particular than the ski. As the snowboarder becomes accustomed to using the snowboard, the snowboarder will be able to control the snowboard delicately by making movements of the legs and waist. As the snowboarder becomes more experienced, the snowboarder will be able to make the movements that are ever impossible with the ski.

When using the snowboard, the user usually glides on the snowboard by having the shoes fastened to a fastening device on the middle of the gliding plate. Although the snowboarder has his or her shoes or ankles fastened to the fastening device on the gliding plate, the snowboarder may lose the balance physically because the upper half of the body is left free. If the snowboarder is a beginner, it is thus not easy to keep the balance. As such, the snowboard may be more familiar than the ski, but it is still difficult for the beginner to control the snowboard as he or she desires.

In order to eliminate the problem described above, a snowboard that is equipped with a handle is proposed as disclosed in Japanese patent application as now published under No. 2001-310008. As described in this publication, the snowboard includes a gliding plate having a gliding surface on its underside, the gliding surface having edges extending in the longitudinal direction thereof along its opposite lateral sides, a rotary shaft mounted on the upper side of the gliding plate on its front side and having a central axis extending across the gliding plate, and a handle portion disposed on the upper side of the gliding plate. The handle portion has grip portions on its top end, and has its bottom end mounted pivotally to the rotary shaft so that the top end of the handle portion can swivel upwardly and downwardly around the rotary shaft by causing the bottom end to turn about the central axis.

The advantage of the snowboard with the handle described above is the improved easiness of operation since it permits the user to keep the physical balance by controlling the handle vertically and flexibly.

When gliding on the snowboard with the handle such as the one disclosed in the above publication, the snowboarder holds the top end of the handle with the bottom end of the handle being supported on the upper side of the gliding plate on its front side. Thus, the pushing force exerted downwardly by the snowboarder downwardly as well as his or her own weight tends largely to be conveyed to the snow through the handle and then through the front side of the gliding plate.

When the snowboarder is gliding over the snow-covered slopes on the zigzag like the slalom using such snowboard, there is a risk that those portions of the edges of the gliding plate along its opposite lateral sides that are located on the forward side of the point where the bottom end of the handle is supported on the gliding plate may go too deeply into the snow. If this occurs, it may be difficult for the snowboarder to glide down the snow-covered slopes while describing large curves. In worse cases, the edges may go so deeply into the snow that the edges cannot be removed from the snow, and the snowboarder would not be able to glide while tracing the curves as desired. In the worst case, the snowboarder might have to glide reversely, rather than gliding forwardly.

In riding on the conventional snowboard with the handle described so far, the snowboarder tries to draw the snowboard toward himself or herself while holding the handle. Thus, the snowboarder can glide over the snow with the forward end of the gliding plate being raised from the snow. It is not easy to learn to glide over the snow in that way, however. It may be easier for the snowboarder to glide in this way when gliding along the straight line, but cannot glide in that way when gliding over the snow-covered slopes on the zigzag like the slalom.

SUMMARY OF THE INVENTION

The present invention relates to a snowboard with a handle, including a gliding plate having a gliding surface on its underside, a rotary shaft mounted on the upper side of the gliding plate on the front side thereof and having a central axis passing across the gliding plate, and a handle portion mounted on the gliding plate, wherein said gliding surface having edges extending from the front side to the rear side along the opposite lateral sides, and wherein said handle portion has a grip portion on its top end, and has its bottom end mounted pivotally to the rotary shaft so that the top end of the handle portion on which the grip portion is located can swivel upwardly and downwardly around the rotary shaft by causing the bottom end of the handle portion to turn about the central axis.

It is therefore one object of the present invention to provide the snowboard with the handle that is designed to permit its user to glide with the improved easiness of operation as well as with the enhanced stability, particularly when gliding down the snow-covered slopes on the zigzag like the slalom.

The problems mentioned above in connection with the prior art snowboard may be solved by several preferred embodiments of the present invention.

Specifically, in its basic form, the snowboard with the handle according to the present invention includes a gliding plate having a gliding surface on its underside, the gliding surface having edges extending from the front side to the rear side along the opposite lateral sides, a rotary shaft mounted on the upper side of the gliding plate on the front side thereof and having a central axis extending across the gliding plate, and a handle portion mounted on the gliding plate, wherein the handle portion has grip portions on its top end, and has its bottom end mounted pivotally to the rotary shaft so that the top end of the handle portion on which the grip portions are located can swivel upwardly and downwardly around the rotary shaft by causing the bottom end of the handle portion to turn about the central axis.

In the snowboard with the handle according to the first embodiment of the present invention that is based on the above described basic form, the portion of the gliding plate that extends from the point where the central axis passes across the gliding plate toward the front side of the gliding plate has the width that is smaller than the width of the portion of the gliding plate that is located at the point where the central axis passes across the gliding plate, and the edges extending along the opposite lateral sides of the gliding plate extend further toward the front side of the gliding plate beyond the point where said central axis passes across the gliding plate.

In the snowboard with the handle according to the second embodiment of the present invention that is based on the above described basic form, the bottom end of the handle portion includes a front side part that is located forwardly of the point where the bottom end is mounted pivotally to the rotary shaft, and is adapted to engage the upper side of the gliding plate, the portion of the gliding plate extending from the point where the front side part of the bottom end is adapted to engage the upper side of the gliding plate toward the front side of the gliding plate has the width that is smaller than the width of the portion of the gliding plate located at the point where the front side part of the bottom end of the handle portion is adapted to engage the upper side of the gliding plate, and the edges extending along the opposite lateral sides of the gliding plate extend further toward the front side of the gliding plate beyond said point where the front side part of the bottom end is adapted to engage the upper side of the gliding plate.

In the snowboard with the handle according to the third embodiment of the present invention that is based on the above described basic form, the bottom end of the handle portion includes a front side part that is located forwardly of the point where the bottom end is mounted pivotally to the rotary shaft, and is adapted to engage the upper side of the gliding plate, the portion of the gliding plate extending from a predetermined position between the point where the front side part of the bottom end of the handle portion is adapted to engage the upper side of the gliding plate and the point where said central axis passes across the gliding plate has the width that is smaller than the width of the portion of the gliding plate located at the above predetermined position, and the edges extending along the opposite lateral sides of the gliding plate extend further toward the front side of the gliding plate beyond that predetermined position between the point where the front side part of the bottom end of the handle portion is adapted to engage the upper side of the gliding plate and the point where the central axis passes across the gliding plate.

Now, how the snowboard 1 with the handle that has been described in accordance with the embodiments of the present invention can be used is described below.

The user or snowboarder may firstly place his or her feet on the middle of the upper side of the gliding plate 2 where the fastening device is located, and may then have the body supported stably by holding the grip portions 32, 32 on the top end of the handle portion 3. The handle portion 3 has its bottom end mounted pivotally to the rotary shaft 24 so that the top end of the handle portion 3 where the grip portion 32, 32 are located can swivel upwardly and downwardly around the rotary shaft 24 by causing the bottom end to turn around the central axis of the rotary shaft 24. By doing so, the snowboarder standing on the middle of the upper side of the gliding plate 2 may hold the grip portions 32, 32 on the top end of the handle portion 3, and may then cause the grip portions 32, 32 to swivel upwardly and downwardly around the rotary shaft 24 as indicated by the double arrow 36 in FIG. 3. Thus, the snowboarder can glide over the snow by moving the grip portions 32, 32 vertically to keep the balance.

When the snowboarder standing on the middle of the upper side of the gliding plate is gliding over the snow, the weight of snowboarder himself or herself as well as the pushing force exerted downwardly by the snowboarder upon the gliding plate may usually be conveyed to the snow through the gliding plate.

In the basic form of the snowboard with the handle according to the present invention, it may be understood that as the bottom end of the handle portion 3 whose top end is held by the snowboarder is supported on the upper side of the gliding plate 2 on its front side, the pushing force exerted downwardly by the snowboarder (the force directed by the arrow 37 in FIG. 3) as well as his or her own weight tends largely to be conveyed onto the snow through the handle portion 3 and then through the front side of the gliding plate 2 (the right side in FIG. 3).

As FIG. 2(a) shows, the gliding plate 2 has edges 21a, 21b on its underside, in which the edges 21a, 21b extend in the longitudinal direction along the opposite lateral sides.

As the pushing force exerted downwardly by the snowboarder as well as his or her own weight that may be conveyed onto the snow through the front side of the gliding plate 2 (the right side in FIG. 3) is increasing, the front side portion 21c of the edge 21a and/or the front side portion 21d of the edge 21b is more likely to go deeply into the snow. This may cause the front side edge portions 21c, 21d of the gliding plate to go so deeply into the snow that it would be difficult for the snowboarder to glide over the snow while describing the large curves as expected.

The present invention may avoid that the above situation would occur, by providing the snowboard with the handle according to the first embodiment described above.

More specifically, the above problem may be avoided by providing the snowboard with the handle according to the first embodiment, wherein the portion of the gliding plate 2 located forwardly of the point where the pushing force exerted downwardly by the snowboarder as well as his or her own weight is conveyed to the gliding plate 2, that is, the point where the central axis of the rotary shaft 24 passes across the gliding plate 2 has the width that is smaller than the width of the portion of the gliding plate 2 located at that point.

The situation where those portions of the edges 21a, 21b extending in the longitudinal direction along the opposite lateral sides of the gliding surface on the underside of the gliding plate 2 and extending further beyond the point (as indicated by 25 in FIG. 2(b)) where the central axis traverses the gliding plate 2 toward the front side would go so deeply into the snow that the snowboarder cannot glide while tracing the curves as expected can be avoided in this way, even when the snowboarder is gliding over the snow-covered slopes on the zigzag like the slalom.

Actually, it should be noted that the front side part 35 of the bottom end of the handle portion 3 that is located ahead of the point where the bottom end of the handle portion 3 is mounted pivotally to the rotary shaft 24 may engage the upper side of the gliding plate 2 when the snowboarder is gliding on the zigzag like the slalom. If this occurs, the pushing force exerted downwardly by the snowboarder as well as the snowboarder's own weight would be conveyed to the gliding plate 2 and then to the snow, through the front side part 35 of the bottom end of the handle portion 3.

In this case, the second embodiment of the present invention that is based on the basic form of the snowboard with the handle as described earlier may be used.

In this second embodiment, the point where the front side part 35 of the bottom end of the handle portion 3 engages the upper side of the gliding plate 2 corresponds to the point as indicated by 23 in FIG. 2(*a*). When the snowboard according to the second embodiment is used, the situation where those portions 21*c* and 21*d* of the edges 21*a* and 21*b* extending in the longitudinal direction along the opposite lateral sides of the gliding surface on the underside of the gliding plate 2 and extending further beyond the point as indicated by 23 in FIG. 2(*a*) toward the front side would go so deeply into the snow that the snowboarder cannot glide while tracing the curves as expected can be avoided in this way, even when the snowboarder is gliding over the snow-covered slopes on the zigzag like the slalom.

It may be seen from FIG. 6(*a*) that the gliding plate that constitutes the snowboard and the like generally includes the middle portion that is curved upwardly, and the front and rear sides that include respective portions making contact with the snow. More specifically, the gliding surface is curved upwardly, beginning with the portions of the rear side of the gliding plate making contact with the snow, e.g., the point where a line segment 27 in FIG. 1 and FIGS. 2(*a*) through (*c*) runs across the gliding plate and toward the rear side and the front side (toward the middle portion of the gliding plate) of the gliding plate. Similarly, the gliding surface is curved upwardly, beginning with the portions of the front side of the gliding plate making contact with the snow, e.g., the point where a line segment 26 in FIG. 1 and FIGS. 2(*a*) through (*c*) runs across the gliding plate and toward the rear side (toward the middle portion of the gliding plate) and the front side of the gliding plate.

The inventor of the present application has made a further study of the first embodiment (shown in FIG. 2(*b*)) and second embodiment (shown in FIG. 2(*a*)) of the present invention, and has found that in the basic form of the snowboard with the handle according to the present invention, the point where the portion of the gliding plate located on the front side engages the snow, e.g., the point where the line segment 26 in FIG. 2 (*c*) traverses the gliding plate on the front side should preferably be located between the point where the front side part 35 of the bottom end of the handle portion 3 engages the upper side of the gliding plate 2 on the forward side of the point where the central axis of the rotary shaft 24 traverses the gliding plate 2 (the point where the line segment 25 in FIG. 2(*b*) traverses the gliding plate 2) and the point where the central axis of the rotary shaft 24 traverses the gliding plate 2 (the point where the line segment 25 in FIG. 2(*b*) traverses the gliding plate 2), in order to ensure that the snowboarder can be gliding over the snow with the enhanced stability.

The third embodiment described earlier is based on the above study of the first and second embodiments, wherein the snowboard is designed such that the point where the portion of the gliding plate located on the front side engages the snow is located between the point where the front side part 35 of the bottom end of the handle portion 3 engages the upper side of the gliding plate 2 on the forward side of the point where the central axis of the rotary shaft 24 traverses the gliding plate 2 and the point where the central axis of the rotary shaft 24 traverses the gliding plate 2. Thus, when the snowboard according to the third embodiment is used, the snowboarder can be gliding over the snow on the zigzag like the slalom with the improved stability.

In this case, it should be noted that the point located between the point where the front side part 35 of the bottom end of the handle portion 3 engages the upper side of the gliding plate 2 and the point where the central axis of the rotary shaft 24 traverses the gliding plate 2 corresponds to the point as indicated by the line segment 26 where the gliding surface 21 is located on the front side and makes contact with the snow.

The situation in which those portions of the edges extending in the longitudinal direction along the opposite lateral sides of the gliding surface on its underside and extending further beyond the above-mentioned point toward the front side, that is, the point where the portion of the gliding plate located on the front side engages the snow would go so deeply into the snow that the snowboarder cannot glide on the snow while tracing the curves as expected can be avoided in this way, even when the snowboarder is gliding over the snow-covered slopes on the zigzag like the slalom.

When using the snowboard with the handle according to any of the embodiments of the present invention that have been described so far, the snowboarder can glide over the snow-covered slopes on the zigzag like the slalom with the enhanced stability. Using this snowboard, even beginners can glide in the same way as the experienced snowboarders.

In the snowboard with the handle according to any of the embodiments of the present invention that have been described so far, the point where the rotary shaft having the central axis across the gliding plate is mounted on the upper side of the gliding plate on its front side may be displaced to any desired position along the length of the gliding plate.

Thus, the point where the rotary shaft 24 is mounted across the gliding plate 2 (the point where the line segment 25 in FIG. 2(*b*) runs across the gliding plate 2) and the point where the front side part 35 of the bottom end of the handle portion 3 engages the upper side of the gliding plate 2 (the point where the ling segment 23 runs across the gliding plate 2) may be adjusted as appropriate, depending upon the physical constitution of a particular snowboarder, such as the height, weight and the like, or the experience or skills of a particular snowboarder. The level of easiness on which the snowboarder can glide on the snowboard may also be controlled accordingly.

BRIEF DESCRIPTION OF THE DRAWINGS

FIGS. 6(a) and 6(b) are side views of the gliding plate in the snowboard with the handle according to the present invention as viewed from the left side in order to illustrate how the gliding plate is curved, with some non-essential parts being not shown for the convenience of the illustration, in which FIG. 6(a) represents that the front side part of the bottom end of the handle on its front side does not engage the upper side of the gliding plate, and FIG. 6(b) represents that the front side part of the bottom end of the handle on its front side engages the upper side of the gliding plate; and FIGS. 7(a) and 7(b) are schematic diagrams of the snowboard with the handle according to the present invention, illustrating how the rotary shaft to which the bottom end of the handle is mounted pivotally can be moved in the forward and backward directions of the gliding plate, in which FIG. 7(a) represents a side view of the bottom end of the handle as viewed from the right side, with some non-essential parts being not shown for the convenience of the illustration, and FIG. 7(b) represents a plan view of the same, with some non-essential parts being not shown for the convenience of the illustration.

BEST MODES OF EMBODYING THE INVENTION

Figure 1:
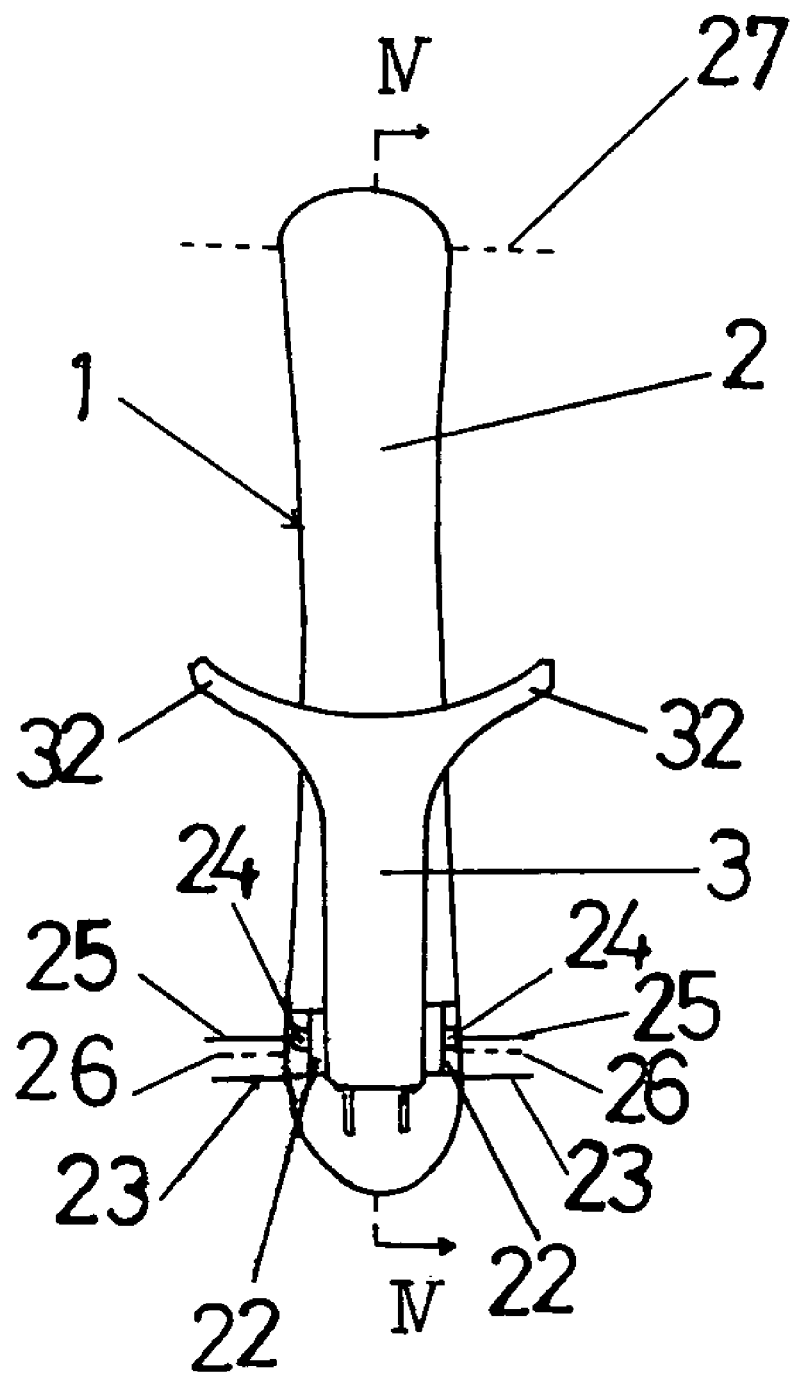
FIG. 1 is a plan view illustrating the snowboard with the handle according to a basic form of the present invention.

Several preferred embodiments of the present invention will now be described in further detail by referring to the accompanying drawings.

The snowboard with the handle according to the present invention, as represented generally by reference numeral 1, includes a gliding plate 2 and a handle portion 3. The underside of the gliding plate 2 provides a gliding surface 21. The gliding surfac 21 has edges 21a, 21b extending in the longitudinal direction thereof (in the vertical direction in FIG. 1) along the opposite lateral sides.

A rotary shaft 24 is mounted on the upper side of the gliding plate 2 on its front side (on the lower side in FIG. 1 or on the right side in FIG. 3), and has its central axis passing across the gliding plate 2.

The handle portion 3 is disposed on the upper side of the gliding plate 2. The handle portion 3 has grip portions 32, 32 on the top end side thereof, and has its bottom end side mounted pivotally to the rotary shaft 24. Thus, the top end side of the handle portion 3 on which the grip portions 32, 32 are provided can swivel upwardly and downwardly about the rotary shaft 24 by causing the bottom end of the handle portion 3 to turn about the central axis, as indicated by a double arrow 36 in FIG. 3.

A pair of hinges 22, 22 is provided on the opposite lateral edges on the upper side of the gliding plate 2 on its front side.

More specifically, the handle portion 3 includes a column 31, the aforementioned grip portions 32, 32 on the top end side of the column 31, and lateral side plates 33, 33 provided on the bottom end side of the column 31, wherein the grip portions 32, 32 are provided on the right and left sides substantially perpendicularly to the column 31.

In the handle portion 3, the lateral side plates 33, 33 are located inside the pair of the hinges 22, 22 of the gliding plate 2.

Figure 3:
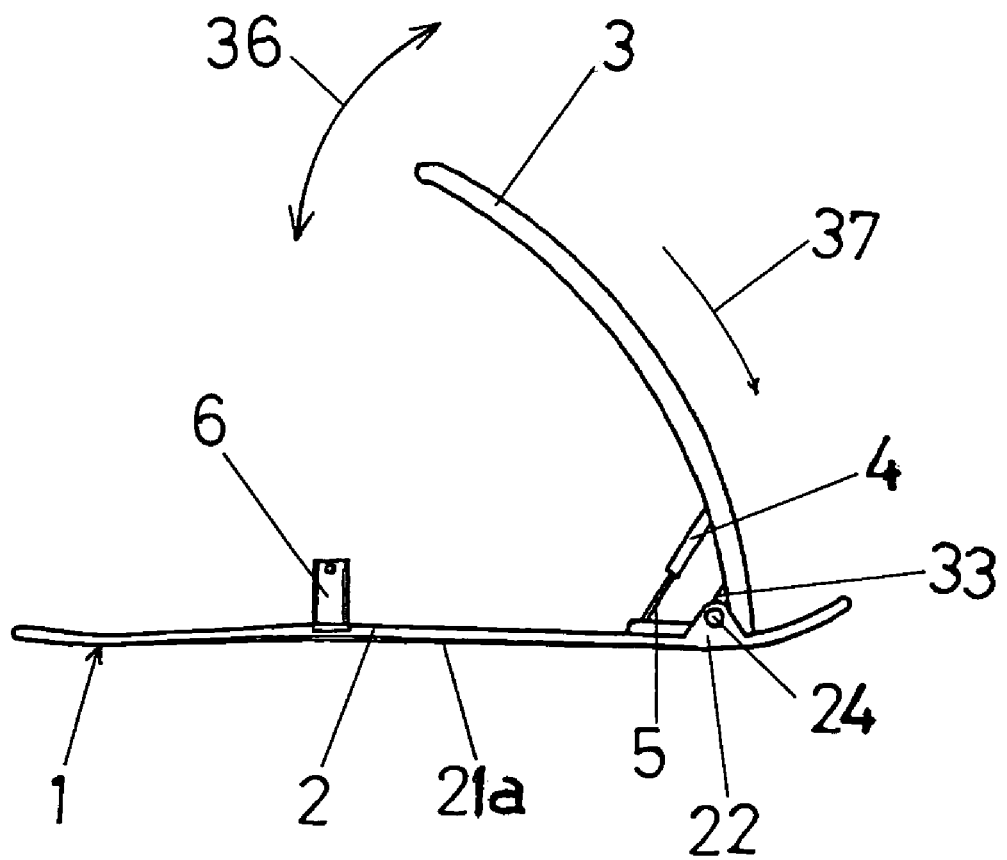
FIG. 3 is side view of the snowboard with the handle according to the present invention as viewed from the left side.

Each of the lateral side plates 33, 33 has a through hole, and each of the hinges 22, 22 has a through hole. The rotary shaft 24 on the upper side of the gliding plate 2 on its front side may be passed through the respective through holes of the lateral plates 33, 33 and hinges 22, 22. This permits the top end side of the handle portion 3 on which the grip portions 32, 32 are located to swivel upwardly and downwardly around the rotary shaft 24 by causing the bottom end of the handle portion 3 to turn around the central axis, as indicated by a double arrow 36 (FIGS. 3 and 4).

Figure 4:
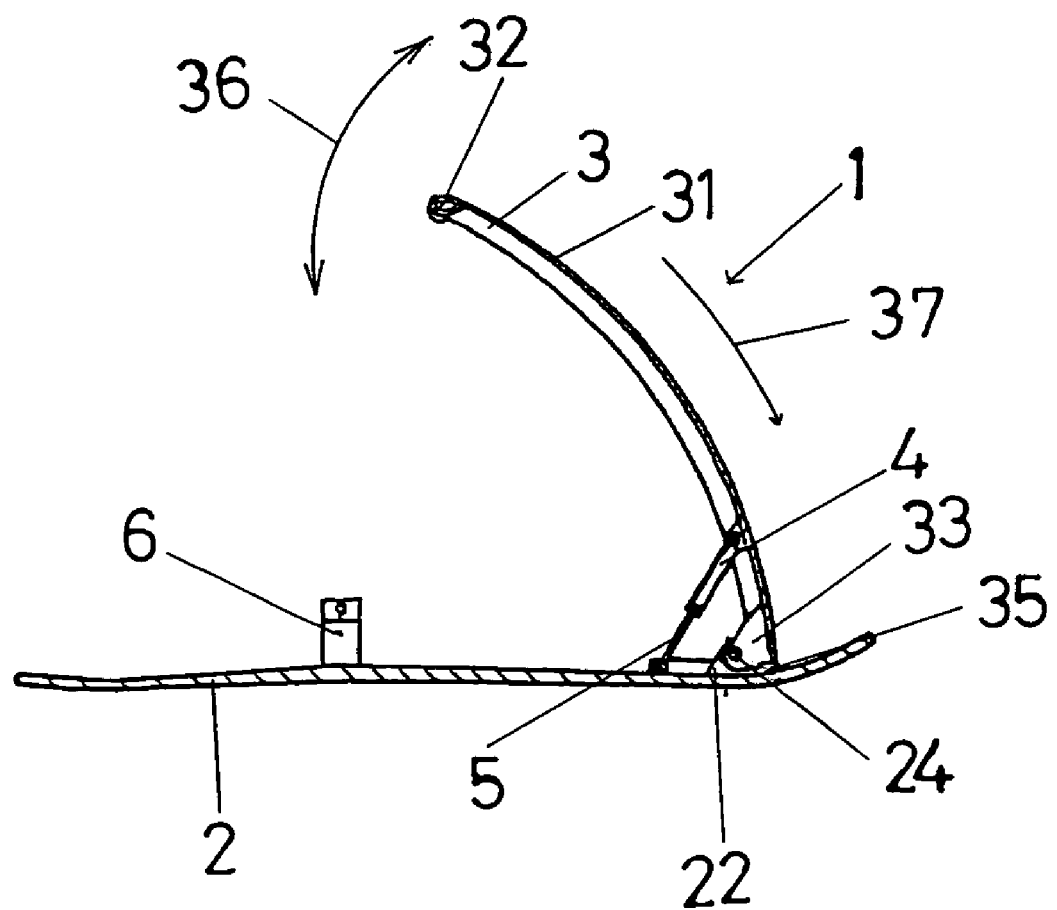
FIG. 4 is a cross-sectional view of the snowboard with the handle shown in FIG. 3 taken along the line IV—IV in FIG. 1.
Figure 6:
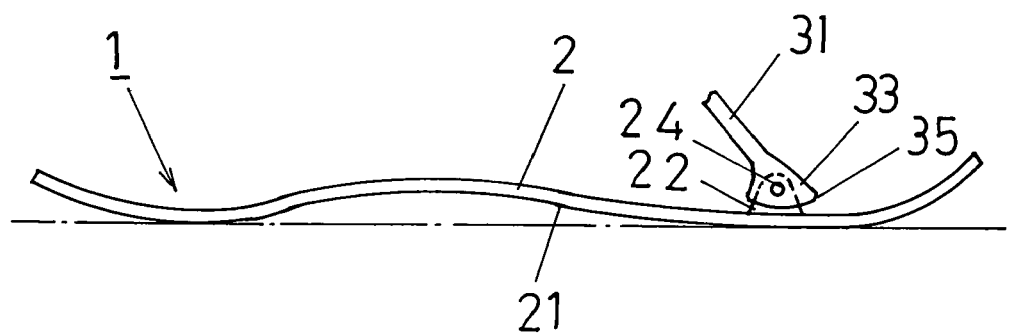
Figure 6:
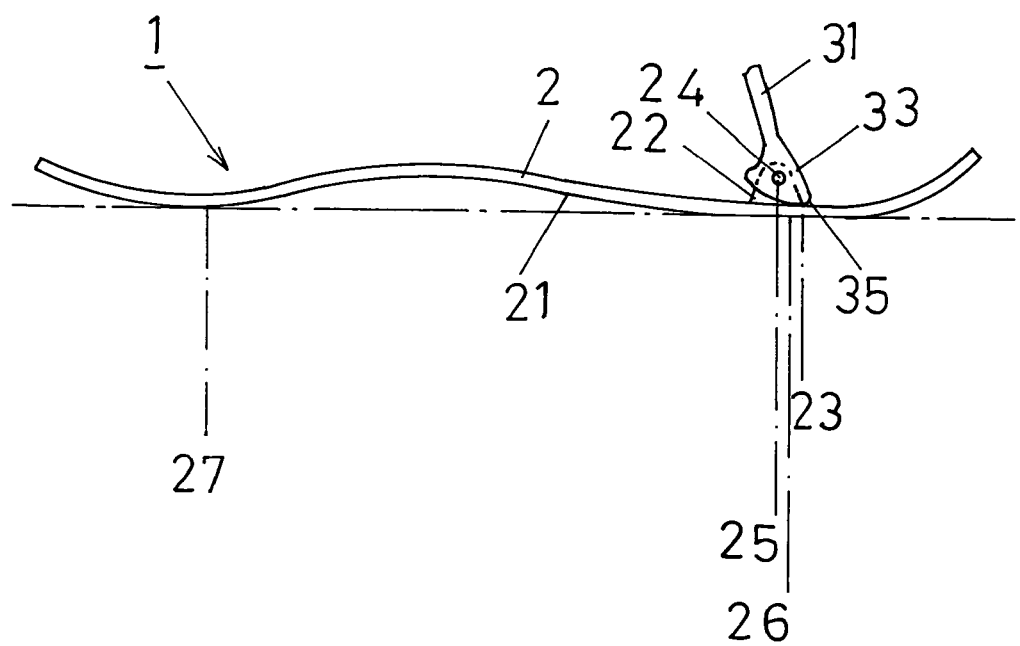

The bottom end side of the handle portion 3 further includes a front side part 35 (FIG. 4 and FIGS. 6(a), (b)) that is located on the forward side of the point where the handle portion 3 is mounted pivotally to the rotary shaft 24, and is adapted to engage the upper side of the gliding plate 2.

In using the snowboard with the handle described so far, the user (snowboarder) may stand on the middle of the upper side of the gliding plate 2 on which a fastening belt 6 is mounted, and may then have his or her feet or shoes fastened to the fastening belt 6 if the snowboarder finds it necessary to do so. After then, the snowboarder may hold the grip portions 32, 32 on the top end side of the handle portion 3, and may then glide over the snow by causing the handle portion 3 to swivel upwardly and downwardly about the rotary shaft 24 of the gliding plate 2 as indicated by a double arrow 36 (FIGS. 3 and 4) in order to keep the balance.

Figure 2:
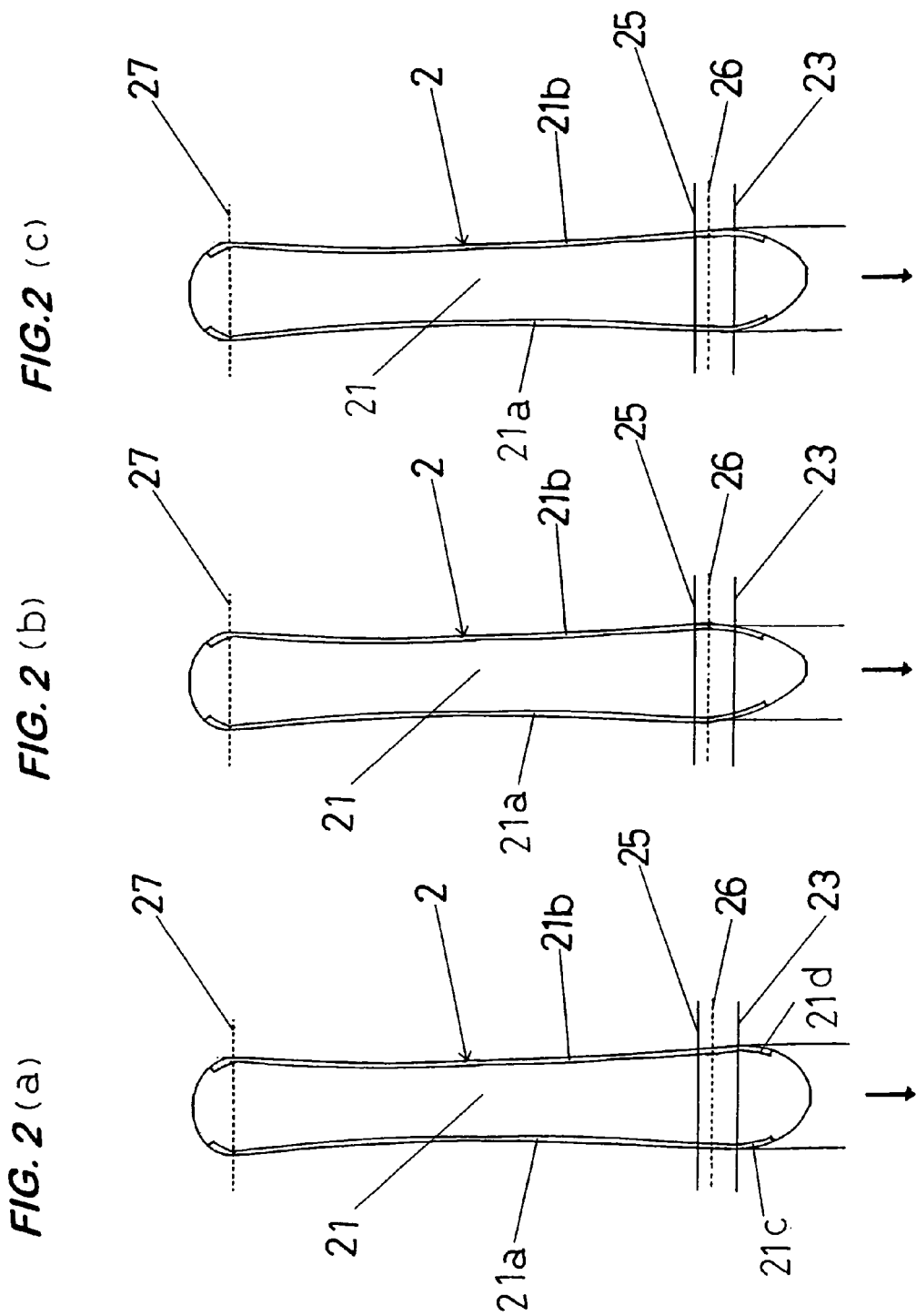
FIGS. 2(*a*), 2(*b*) and 2(*c*) are plan views illustrating the underside, or gliding surface, of the gliding plate in the snowboard with the handle according to several embodiments of the invention, in which FIG. 2(*a*) represents the second embodiment, FIG. 2(*b*) represents the first embodiment and FIG. 2(*c*) represents the third embodiment.

In the snowboard with the handle according to the present invention, it may be seen from FIG. 2(a) that the portion of the gliding plate 2 that extends on the front side (on the lower side in FIG. 1) from the point where the front side part 35 of the bottom end of the handle portion 3 engages the upper side of the gliding plate 2 (the point where a line segment as represented by 23 in FIGS. 1 and 2 passes across the gliding plate 2) is less wide than the portion of the gliding plate 2 located at the point where the front side part 35 of the bottom end engages the upper side of the gliding plate 2.

As the snowboarder on the snowboard with the handle is gliding over the snow on a zigzag like the slalom, the snowboarder may hold the handle portion 3 with the front side part 35 of the bottom end engaging the upper side of the gliding plate 2. In this case, the pushing force exerted downwardly by the snowboarder as well as the snowboarder's own weight may tend largely to be conveyed to the snow through the handle portion 3, the front side part 35 of the bottom end of the handle portion 3 and the front side of the gliding plate 2.

In the snowboard with the handle according to the present invention as shown in FIG. 2(a), the portions of the edges 21a, 21b extending in the longitudinal direction of the gliding plate 2 along the opposite lateral sides of the gliding surface 21 on the underside of the gliding plate 2 and extending further toward the front side beyond the point where the front side part 35 of the bottom end of the handle portion 3 engages the upper side of the gliding plate 2 (the point where the line segment 23 passes across the gliding plate 2 in FIGS. 1 and 2) will not go too deeply into the snow, even when the force and weight are conveyed to the snow as described above.

The reason for which the above situation will not occur is that the portion of the gliding plate 2 that extends forwardly (toward the lower side in FIGS. 1 and 2) of the point where the front side part 35 of the bottom end of the handle portion 3 engages the upper side of the gliding plate 2 (the point where the line segment 23 passes across the gliding plate 2) is less wide than the portion of the gliding plate 2 located at the point where the front side part 35 of the bottom end of the handle portion 3 engages the upper side of the gliding plate 2.

Using the snowboard with the handle according to the present invention, one can drastically improve the skill and stability of gliding when one is riding over the snow on the zigzag like the slalom. Even beginners can also glide in the same way as the experienced snowboarder can, and can thus be gliding over the snow while tracing large curves with the improved stability.

It should be noted that the pushing force that has been exerted downwardly by the snowboarder through the top end of the handle portion 3 held by the snowboarder to the gliding plate 2 when the snowboarder is gliding over the snow is not only conveyed to the snow through the handle portion 3 and then through the front side part 35 of the bottom end of the handle portion 3. Then, in order to permit the snowboarder to glide over the snow on the zigzag like the slalom more stably by tracing large curves, it is preferred that the portion of the gliding plate 2 that extends forwardly of the point where the central axis of the rotary shaft 24 passed across the gliding plate 2 (the point where the line segment 25 traverses the gliding plate 2 in FIG. 2) should be less wide than the portion of the gliding plate 2 located at the point where the central axis of the rotary shaft 24 passes across the gliding plate 24, as shown in FIG. 2(b).

The situation in which the portions of the edges 21a, 21b extending in the longitudinal direction of the gliding plate 2 along the opposite lateral sides of the gliding surface 21 on the underside of the gliding plate 2 and extending further forwardly beyond the point where the central axis of the rotary shaft 24 passes across the gliding plate 2 might go too deeply into the snow, thus disabling the snowboarder to glide over the snow by tracing large curves can be avoided in this way, even when the pushing force that has been exerted downwardly by the snowboarder through the top end of the handle portion 3 held by the snowboarder and then through the gliding plate 2 is conveyed to the snow as indicated by an arrow 37 (FIGS. 3 and 4) when the snowboarder is gliding over the snow on the zigzag like the slalom. This is because the portion of the gliding plate 2 extending forwardly of the point where the central axis of the rotary shaft 24 traverses the gliding plate 2 (the point where the line segment 25 passes across the gliding plate 2 in FIG. 2 (b)) is less wide than the portion of the gliding plate 2 located at the point where the central axis of the rotary shaft 24 passes the gliding plate 2.

It may be seen from FIGS. 6(a) and (b) that for the snowboard and the like, the gliding surface of the gliding plate 2 is generally formed to include the middle portion that curves upwardly, and the front and rear sides that make contact with the snow.

When the point where the portion of the gliding surface 21 located on the front side makes contact with the snow (the point where the line segment 26 traverses the gliding plate 2 in FIG. 2(c)) is located between the point where the front side part 35 of the bottom end of the handle portion 3 engages the upper side of the gliding plate 2 and the point where the central axis of the rotary shaft 24 traverses the gliding plate 2, it is desirable that the portion of the gliding plate 2 extending forwardly of a particular point (the point where the line segment 26 passes across the gliding plate 2 in FIG. 2(c), which corresponds to the point where the portion of the gliding surface 21 makes contact with the snow, and which exists between the point where the front side part 35 of the bottom end of the handle portion 3 engages the upper side of the gliding plate 2 and the point where the central axis of the rotary shaft 24 passes across the gliding plate 2) should be less wide than the portion of the gliding plate 2 located at said particular point (the point where the line segment 26 passes across the gliding plate 2 in FIG. 2(c), which corresponds to the point where the portion of the gliding surface 21 makes contact with the snow).

The situation in which the portions of the edges 21a, 21b extending in the longitudinal direction of the gliding plate 2 along the opposite lateral sides of the gliding surface 21 on the underside of the gliding plate 2 and extending further forwardly beyond the above particular point (the point where the line segment 26 traverses the gliding plate 2 in FIG. 2, that is, the point where the portion of the gliding surface 21 located on the front side makes contact with the snow) might go too deeply into the snow, thus disabling the snowboarder to glide over the snow by tracing large curves can be avoided in this way, even when the pushing force that has been exerted downwardly by the snowboarder through the top end of the handle portion 3 held by the snowboarder and then through the gliding plate 2 is conveyed to the snow as indicated by an arrow 37 (FIGS. 3 and 4) when the snowboarder is gliding over the snow on the zigzag like the slalom. This is because the portion of the gliding plate 2 extending forwardly of that particular point (the point where the line segment 26 traverses the gliding plate 2 in FIG. 2, that is, the point where the portion of the gliding surface 21 located on the front side makes contact with the snow) located between the point where the front side part 35 of the bottom end of the handle portion 3 engages the upper side of the gliding plate 2 and the point where the central axis of the rotary shaft 24 traverses the gliding plate 2 is less wide than the portion of the gliding plate 2 located at that particular point (the point where the line segment 26 traverses the gliding plate 2 in FIG. 2, that is, the point where the portion of the gliding surface 21 located on the front side makes contact with the snow).

Figure 5:
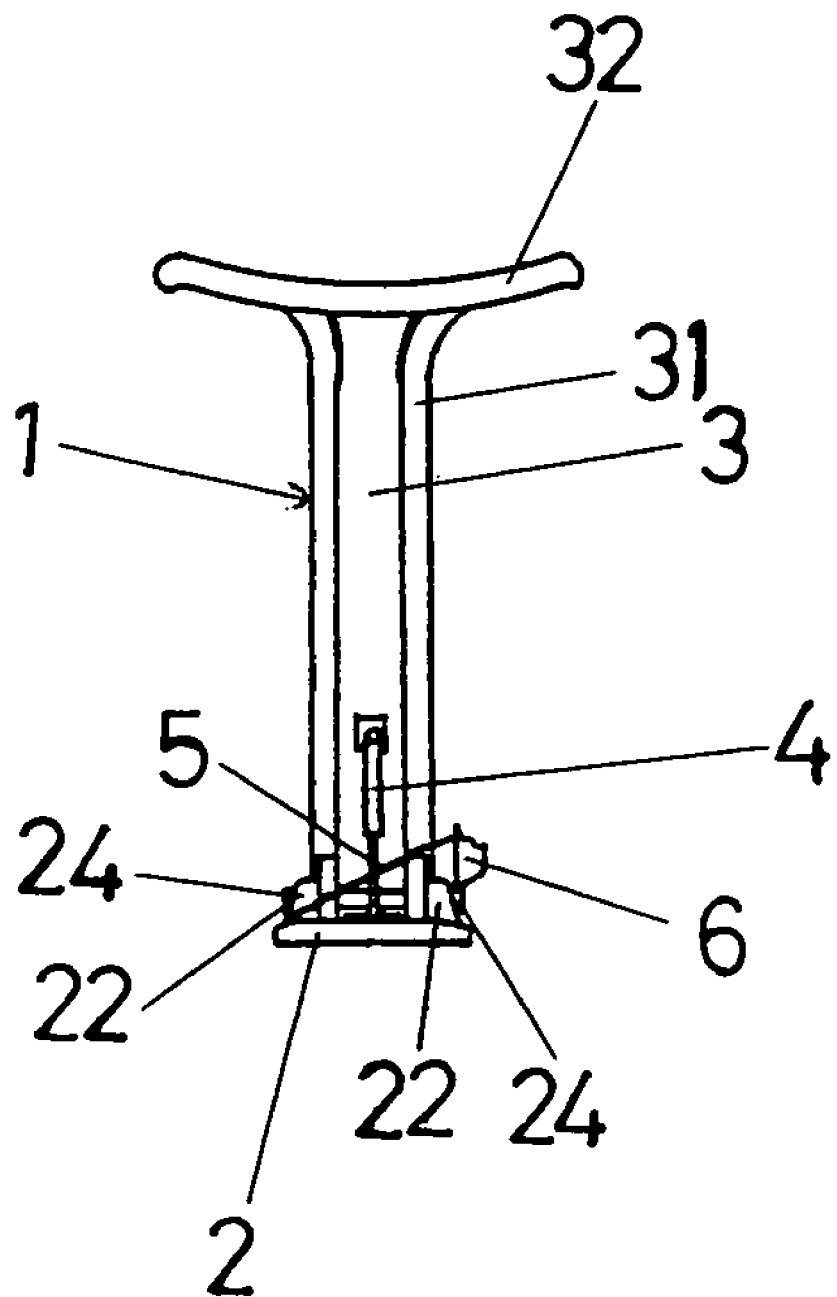
FIG. 5 is a rear view of the snowboard with the handle shown in FIG. 3.

Referring to FIGS. 3 through 5, a support pipe 4 is shown. The support pipe 4 extends from the underside of the handle portion 3 so that its top end can turn pivotally. A support rod 5 is mounted pivotally so that its bottom end can abut against the upper side of the gliding plate 2 and its top end can be inserted slidably into the open bottom end of the support pipe 4.

As the support pipe 4 extends from the handle portion 3 so that it can swivel, and the support rod 5 abuts against the gliding plate 2 so that it can swivel and can be inserted slidably into the support pipe 4, the snowboarder can operate the handle portion 3 so easily that it can be swiveled upwardly and downwardly without disturbing his or her posture.

The snowboarder can glide over the snow by swiveling the handle portion 3 upwardly and downwardly in order to keep the balance.

The snowboarder can carry the snowboard with the handle 1 by folding the handle portion 3 downwardly until it is placed in flush with the gliding plate 2.

The fastening belt 6 for securing the snowboarder's shoes to the gliding plate 2 is mounted slightly rearward of the middle of the gliding plate 2, and has its opposite ends fixed to the lateral sides of the gliding plate 2. Specifically, the belt 6 consists of two straps, one strap having its base end secured to one lateral side of the gliding plate 2 and having a male hook on the other end. The other strap has its base end mounted pivotally to the other lateral side of the gliding plate 2, and has a female hook on the other end. Then, the snowboarder may have his or her shoes fastened to the gliding plate 2 by placing the shoes on the upper side of the gliding plate 2, passing the one strap over the other strap, and locking the male hook of the one strap to the female hook of the other strap.

Figure 7:
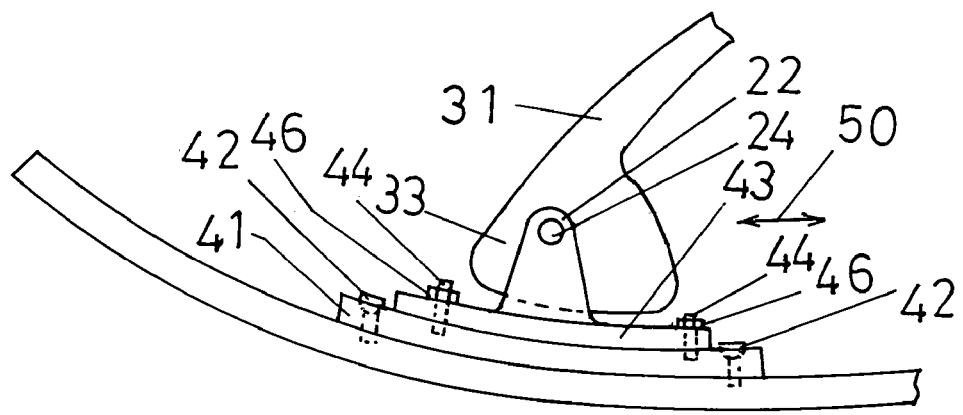
Figure 7:
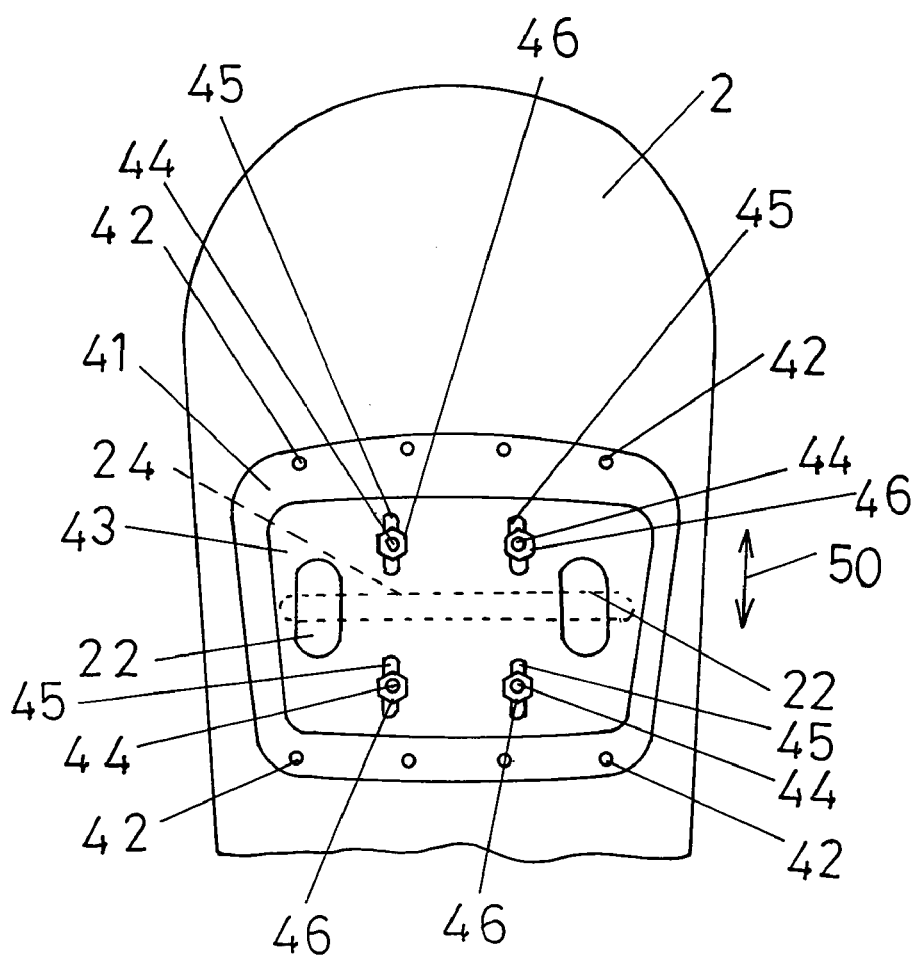

According to the snowboard with the handle of the present invention, as shown in FIGS. 7(a) and (b), the rotary shaft 24 to which the bottom end of the handle portion 3 is mounted pivotally may be displaced to any position by moving it forth or back along the longitudinal direction of the gliding plate 2 (in the direction as indicated by a double arrow 50).

A first support plate 41 is secured to the upper side of the gliding plate 2 by any appropriate fixing means 42. Four bolts 44 have the respective bottom ends fixed to the first support plate 41, projecting upwardly through the first support plate 41. A second support plate 43 is placed over the first support plate 41, and has four elongated grooves 45 through which the corresponding four bolts 44 may be inserted slidably in the longitudinal direction of the gliding plate 2 (in the direction as indicated by the double arrow 50).

A pair of hinges 22, 22 is mounted to the second support plate 43, and the rotary shaft 24 may be passed through holes on the hinges 22 and through holes on the lateral plates 33, 33 of the handle portion 3. Thus, the top end of the handle portion 3 in which the grip portions 32, 32 are provided may be swiveled upwardly and downwardly around the rotary shaft 24 as indicated by a double arrow 36 (FIGS. 3 and 4).

The rotary shaft 24 of the handle portion 3 may be displaced to any desired position by loosening the respective nuts 46 from the corresponding bolts 44 and then moving the second support plate 43 to the desired position along the length of the gliding plate 2 (in the direction as indicated by the double arrow 50), where the nuts 46 may be retightened to the bolts 44, thereby fixing the second support plate 43 onto the first support plate 41.

Then, the rotary shaft 24 to which the bottom end of the handle portion 3 is mounted pivotally may be displaced to the desired position by moving it along the length of the gliding plate 2 (in the direction as indicated by the double arrow 50).

As the rotary shaft 24 to which the bottom end of the handle portion 3 is mounted pivotally may be displaced to the desired position by moving it along the length of the gliding plate 2 (in the direction as indicated by the double arrow 50), the point where the rotary shaft 24 traverses the gliding plate 2 (the point where the line segment 23 traverses the gliding plate 2 in FIG. 2(b)) or the point where the front side part 35 of the bottom end of the handle portion 3 engages the upper side of the gliding plate 2 (the point where the line segment 23 traverses the gliding plate 2 in FIG. 2(a)) may be adjusted as desired, depending upon the physical constitution (such as the height, weight and the like) and/or skill or experience of the particular snowboarder gliding on the snowboard with the handle 1 according to the present invention. The easiness of riding on the snowboard may also be adjusted, depending upon the physical constitution (such as the height, weight and the like) and/or skill or experience of the particular snowboarder riding on the snowboard with the handle 1 according to the present invention.

It may be appreciated that the rotary shaft 24 to which the bottom end of the handle portion 3 is mounted pivotally may be displaced along the length of the gliding plate 2 (in the direction indicated by the double arrow 50) by any appropriate means other than those shown and described in FIGS. 7(a) and (b).

Although the present invention has been described with reference to the particular preferred embodiments thereof by referring to the accompanying drawings, it should be understood that various changes and modifications may be made to those embodiments within the scope and spirit of the invention as defined in the appended claims.

What is claimed is:

1. A snowboard with a handle, including:
    a gliding plate having a gliding surface on its underside, the gliding surface having edges extending from a front end to a rear end along opposite lateral sides;
    a rotary shaft mounted on an upper side of the gliding plate on a front side thereof and having a central axis passing across the gliding plate; and
    a handle portion mounted on the gliding plate, wherein the handle portion has a grip portion on its top end, and has its bottom end mounted pivotally to the rotary shaft so that the top end of the handle portion on which the grip portion is located can swivel upwardly and downwardly around the rotary shaft by causing the bottom end of the handle portion to turn about the central axis;
    the bottom end of the handle portion includes a front side part that is located forwardly of a point where the bottom end is mounted pivotally to the rotary shaft, and is adapted to engage the upper side of the gliding plate;
    a portion of the gliding plate extending toward the front side of the gliding plate from the point where the front side part of the bottom end of the handle portion is adapted to engage the upper side of the gliding plate has a width that is smaller than the width of the portion of the gliding plate located at the point where the front side part of the bottom end of the handle portion is adapted to engage the upper side of the gliding plate; and
    the edges extending along the opposite lateral sides of the gliding plate extend further toward the front side of the gliding plate beyond the point where the front side part of the bottom end of the handle portion is adapted to engage the upper side of the gliding plate.

2. A snowboard with a handle as defined in claim 1, wherein the location where the rotary shaft having the central axis passing across the gliding plate is provided on the upper side of the gliding plate on its forward side can be displaced adjustably from the front side toward the rear side or vice versa.

3. A snowboard with a handle, including:
    a gliding plate having a gliding surface on its underside, the gliding surface having edges extending from a front end to a rear end along opposite lateral sides;
    a rotary shaft mounted on an upper side of the gliding plate on a front side thereof and having a central axis passing across the gliding plate; and
    a handle portion mounted on the gliding plate, wherein the handle portion has a grip portion on its top end, and has its bottom end mounted pivotally to the rotary shaft so that the top end of the handle portion on which the grip portion is located can swivel upwardly and downwardly around the rotary shaft by causing the bottom end of the handle portion to turn about the central axis;
    the bottom end of the handle portion includes a front side part that is located forwardly of a point where the bottom end is mounted pivotally to the rotary shaft, and is adapted to engage the upper side of the gliding plate;
    a portion of the gliding plate extending toward the front side of the gliding plate from a predetermined position between the point where the front side part of the bottom end of the handle portion is adapted to engage the upper side of the gliding plate and the point where the central axis passes across the gliding plate has a width that is smaller than the width of the portion of the gliding plate located at the predetermined position; and the edges extending along the opposite lateral sides of the gliding plate extend further toward the front side of the gliding plate beyond said predetermined position existing between the point where the front side part of the bottom end of the handle portion is adapted to engage the upper side of the gliding plate and the point where the central axis passes across the gliding plate.

4. A snowboard with a handle as defined in claim 3, wherein the location where the rotary shaft having the central axis passing across the gliding plate is provided on the upper side of the gliding plate on its forward side can be displaced adjustably from the front side toward the rear side or vice versa.

* * * * *